(12) United States Patent
Lecesne et al.

(10) Patent No.: US 11,405,484 B2
(45) Date of Patent: Aug. 2, 2022

(54) VARIABLE-INTENSITY IMMERSION FOR EXTENDED REALITY MEDIA

(71) Applicants: AT&T Intellectual Property I, L.P., Atlanta, GA (US); AT&T Mobility II LLC, Atlanta, GA (US)

(72) Inventors: Terrel Lecesne, Round Rock, TX (US); John Oetting, Zionsville, PA (US); Eric Zavesky, Austin, TX (US); James H. Pratt, Round Rock, TX (US); Jason Decuir, Cedar Park, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 17/106,805

(22) Filed: Nov. 30, 2020

(65) Prior Publication Data
US 2022/0174131 A1   Jun. 2, 2022

(51) Int. Cl.
| | |
|---|---|
| *G06F 15/16* | (2006.01) |
| *H04L 67/306* | (2022.01) |
| *G06T 19/00* | (2011.01) |
| *H04L 67/50* | (2022.01) |

(52) U.S. Cl.
CPC .......... *H04L 67/306* (2013.01); *G06T 19/006* (2013.01); *H04L 67/22* (2013.01)

(58) Field of Classification Search
CPC ................ H04L 67/306; H04L 63/123; H04N 21/25808; H04N 21/25891; H04N 21/251; H04N 21/4532; H04N 21/44218; H04N 21/816

USPC .......... 709/217, 218, 219, 203, 238
See application file for complete search history.

(56) References Cited

U.S. PATENT DOCUMENTS

| | | |
|---|---|---|
| 8,732,662 B1 | 5/2014 | Savant |
| 10,242,476 B2 | 3/2019 | Bastaldo-Tsampalis et al. |
| 10,482,677 B1 | 11/2019 | Iyer et al. |
| 10,484,811 B1 | 11/2019 | Mindlin et al. |
| 10,740,918 B2 | 8/2020 | Iyer et al. |
| 10,816,341 B2 | 10/2020 | Iyer et al. |
| 10,817,050 B2 | 10/2020 | Iyer et al. |
| 10,852,819 B2 | 12/2020 | Iyer et al. |
| 2005/0025465 A1* | 2/2005 | Danieli .............. H04N 21/8352 386/243 |
| 2014/0111523 A1 | 4/2014 | Scholler |
| 2015/0100891 A1 | 4/2015 | Tobin |
| 2015/0268717 A1 | 9/2015 | Schlumberger et al. |

(Continued)

*Primary Examiner* — Kaylee J Huang

(57) ABSTRACT

An example method includes obtaining a profile of a user using a user device to present an immersive experience, wherein the profile specifies a user reaction indicator and a value that represents a baseline for the user reaction indicator, presenting the immersive experience on the user device, receiving user state data including a current value of the user reaction indicator, determining that the current value of the user reaction indicator deviates from the value that represents the baseline by more than a threshold, in response to the determining, selecting, from among a plurality of variants for a segment of the immersive experience, a variant that is expected to cause the current value of the user reaction indicator to adjust to a value that does not deviate from the value that represents the baseline by more than the threshold, and presenting the variant that is selected on the user device.

20 Claims, 3 Drawing Sheets

(56) References Cited

U.S. PATENT DOCUMENTS

| | | |
|---|---|---|
| 2016/0055420 A1* | 2/2016 | Karanam ............... A61B 5/165 700/52 |
| 2016/0195921 A1* | 7/2016 | Evans ...................... G06F 3/02 297/217.3 |
| 2016/0313790 A1 | 10/2016 | Clement et al. |
| 2016/0350868 A1 | 12/2016 | Votaw et al. |
| 2017/0039045 A1 | 2/2017 | Abrahami et al. |
| 2017/0180435 A1 | 6/2017 | Edwards |
| 2017/0192620 A1 | 7/2017 | Kim et al. |
| 2017/0263147 A1* | 9/2017 | King .................... G11B 27/026 |
| 2017/0302903 A1 | 10/2017 | Ng et al. |
| 2018/0024630 A1 | 1/2018 | Goossens |
| 2018/0060948 A1 | 3/2018 | Mattingly et al. |
| 2018/0096517 A1* | 4/2018 | Mallinson .......... G02B 27/0093 |
| 2018/0190376 A1* | 7/2018 | Hill ........................ A61B 5/375 |
| 2018/0206069 A1 | 7/2018 | Santos |
| 2018/0219950 A1 | 8/2018 | Hodge |
| 2018/0255335 A1* | 9/2018 | George ............ H04N 21/44222 |
| 2018/0286070 A1* | 10/2018 | Benedetto ............... G06F 3/013 |
| 2018/0357865 A1 | 12/2018 | Saidi |
| 2019/0172264 A1* | 6/2019 | Oh .......................... G06F 3/015 |
| 2019/0251622 A1 | 8/2019 | Wiedmeyer et al. |
| 2019/0278591 A1 | 9/2019 | Sharma et al. |
| 2019/0278697 A1 | 9/2019 | Sharma et al. |
| 2020/0029164 A1 | 1/2020 | Swaminathan et al. |
| 2020/0049989 A1 | 2/2020 | Brown et al. |
| 2020/0059502 A1 | 2/2020 | Iyer et al. |
| 2020/0065584 A1 | 2/2020 | Iyer |
| 2020/0196086 A1 | 6/2020 | Swaminathan et al. |
| 2020/0280496 A1 | 9/2020 | Getting et al. |
| 2020/0326699 A1 | 10/2020 | Bastian, II et al. |
| 2020/0344549 A1 | 10/2020 | Wegener |
| 2020/0398020 A1 | 12/2020 | Bathina et al. |
| 2021/0019936 A1* | 1/2021 | Oyman ................... G06T 9/001 |
| 2021/0160644 A1 | 5/2021 | Olivieri et al. |
| 2021/0405736 A1 | 12/2021 | Zavesky et al. |
| 2021/0407272 A1 | 12/2021 | Jackson et al. |

\* cited by examiner

VARIABLE-INTENSITY IMMERSION FOR EXTENDED REALITY MEDIA

The present disclosure relates generally to media distribution, and relates more particularly to devices, non-transitory computer-readable media, and methods for providing variable-intensity immersion for extended reality media.

BACKGROUND

Consumers (e.g., users of media content, hereinafter also referred to as simply "users") are being presented with an ever increasing number of services via which media content can be accessed and enjoyed. For instance, streaming video and audio services, video on demand services, social media, and the like are offering more forms of content (e.g., short-form, always-on, raw sensor feed, etc.) and a greater number of distribution channels (e.g., mobile channels, social media channels, streaming channels, just-in-time on-demand channels, etc.) than have ever been available in the past. As the number of choices available to users increases and diversifies, service providers seeking to retain their customer bases are looking for ways to increase the engagement of their customers with their content.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
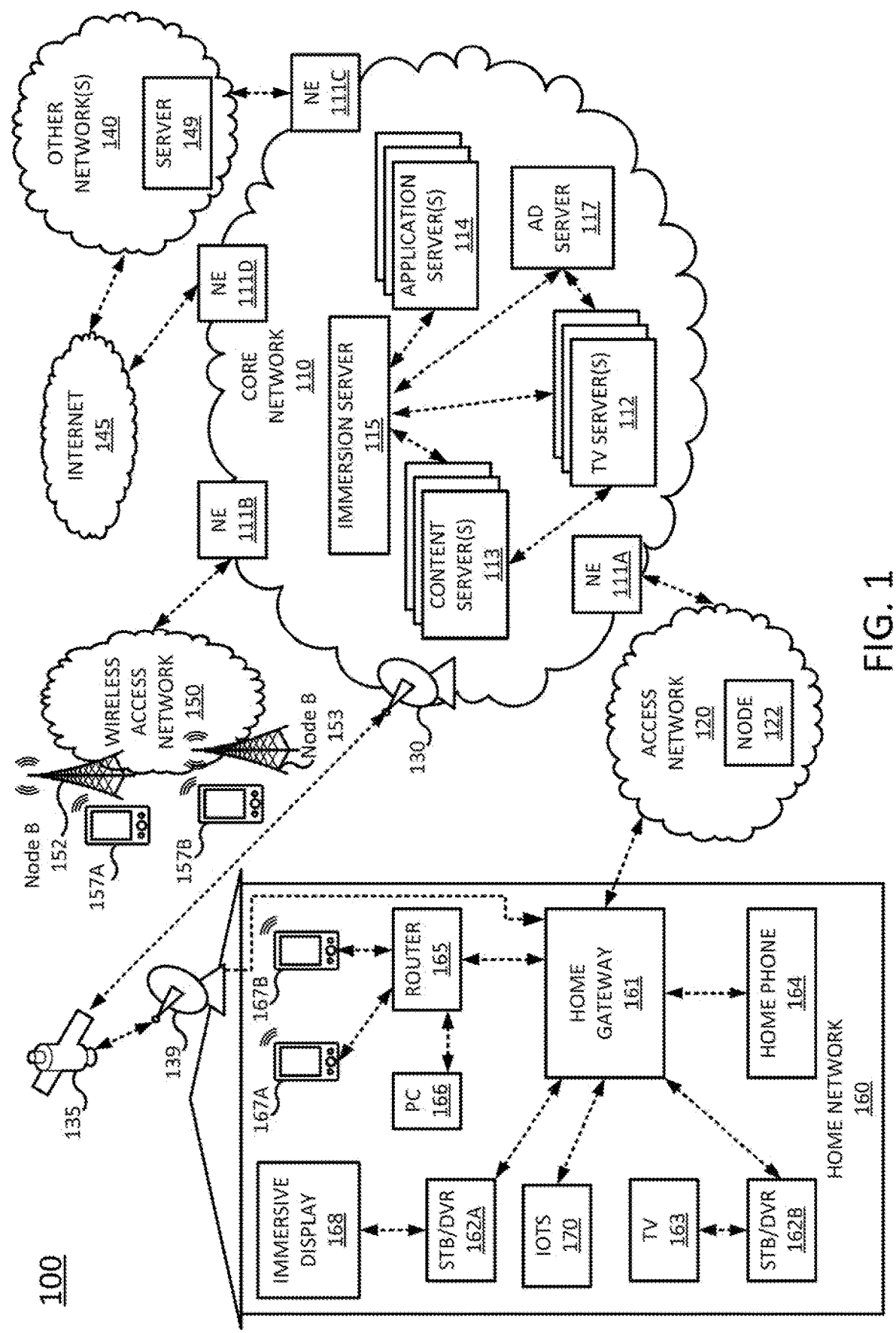
FIG. 1 illustrates an example system in which examples of the present disclosure for providing variable-intensity immersion for extended reality media may operate.

The present disclosure broadly discloses methods, computer-readable media, and systems for providing variable-intensity immersion for extended reality media. In one example, a method performed by a processing system includes obtaining a profile of a user who is using a user device on which an immersive experience is to be presented, wherein the profile specifies a user reaction indicator and a value that represents a baseline for the user reaction indicator for the user, presenting the immersive experience on the user device, receiving user state data including a current value of the user reaction indicator for the user, wherein the user state data is received from at least one selected from a group of: the user device and a sensor that is located in proximity to the user device, determining that the current value of the user reaction indicator for the user deviates from the value that represents the baseline by more than a threshold, in response to the determining, selecting, from among a plurality of variants for a segment of the immersive experience, a variant that is expected to cause the current value of the user reaction indicator for the user to adjust to a value that does not deviate from the value that represents the baseline by more than the threshold, and presenting the variant that is selected on the user device.

In another example, a non-transitory computer-readable medium may store instructions which, when executed by a processing system in a communications network, cause the processing system to perform operations. The operations may include obtaining a profile of a user who is using a user device on which an immersive experience is to be presented, wherein the profile specifies a user reaction indicator and a value that represents a baseline for the user reaction indicator for the user, presenting the immersive experience on the user device, receiving user state data including a current value of the user reaction indicator for the user, wherein the user state data is received from at least one selected from a group of: the user device and a sensor that is located in proximity to the user device, determining that the current value of the user reaction indicator for the user deviates from the value that represents the baseline by more than a threshold, in response to the determining, selecting, from among a plurality of variants for a segment of the immersive experience, a variant that is expected to cause the current value of the user reaction indicator for the user to adjust to a value that does not deviate from the value that represents the baseline by more than the threshold, and presenting the variant that is selected on the user device.

In another example, a device may include a processing system including at least one processor and non-transitory computer-readable medium storing instructions which, when executed by the processing system when deployed in a communications network, cause the processing system to perform operations. The operations may include obtaining a profile of a user who is using a user device on which an immersive experience is to be presented, wherein the profile specifies a user reaction indicator and a value that represents a baseline for the user reaction indicator for the user, presenting the immersive experience on the user device, receiving user state data including a current value of the user reaction indicator for the user, wherein the user state data is received from at least one selected from a group of: the user device and a sensor that is located in proximity to the user device, determining that the current value of the user reaction indicator for the user deviates from the value that represents the baseline by more than a threshold, in response to the determining, selecting, from among a plurality of variants for a segment of the immersive experience, a variant that is expected to cause the current value of the user reaction indicator for the user to adjust to a value that does not deviate from the value that represents the baseline by more than the threshold, and presenting the variant that is selected on the user device.

As discussed above, as the number of services via which users may access media content increases and diversifies, service providers seeking to retain their customer bases are looking for ways to increase the engagement of their customers with their content. Some approaches attempt to maximize a user's engagement with content by making the content immersive. For instance, technologies have emerged in the past few years that can provide various types and degrees of sensory experiences to make a user feel as if he is immersed in the content. As an example, if a user is playing a video game on a head mounted display, and the video game takes place in a desert environment, a smart thermostat could be adjusted to raise the ambient temperature, and a smart lighting system could brighten the ambient lighting, so that the user feels as if he is actually in the desert.

Comfort with these types of immersive enhancements may vary from one person to another. For instance, a person who is afraid of heights may not enjoy an XR environment that simulates looking down from the top of a skyscraper or flying over a city. However, another person may be unbothered by such a simulation and may even enjoy being immersed in the environment. Thus, a one-size-fits-all approach to immersive XR content may leave some users feeling dissatisfied or even deeply uncomfortable with the experience, leading to decreased user engagement.

Examples of the present disclosure may determine a baseline level of user comfort that may be defined by one or more observable indicators. The user's reactions to an immersive XR environment that is being presented to the user, such as a video game, an immersive or volumetric video, an augmented reality media, or the like, may then be continuously monitored. In response the observable indicators deviating from the baseline by more than a threshold, the presentation of the content may be dynamically adapted to bring the observable indicators closer to the baseline level of user comfort. For instance, an ambient temperature may be lowered to simulate an arctic environment of a video game. If the user appears to be shivering uncontrollably after the temperature is lowered, the temperature may be gradually raised to a point where the user's shivering stops. Alternatively, a scene of a video game may simulate a high-speed car chase from the perspective of a character in the car's passenger seat. If the user's heart rate is observed to increase by more than a threshold above a baseline heart rate for the user after being presented with the start of the car chase, the speed of the simulated car chase may be gradually decreased to a point where the user's heart rate is brought back to a rate whose difference from the baseline heart rate is less than the threshold.

Although examples of the present disclosure are discussed within the context of visual media, it will be appreciated that the examples described herein could apply equally to non-visual media, or to media that does not have a visual component. For instance, examples of the present disclosure could be used to dynamically adapt a podcast, a streaming radio station, an audio book, or the like.

To better understand the present disclosure, FIG. 1 illustrates an example network 100, related to the present disclosure. As shown in FIG. 1, the network 100 connects mobile devices 157A, 157B, 167A and 167B, and home network devices such as home gateway 161, set-top boxes (STBs) 162A, and 162B, television (TV) 163, home phone 164, router 165, personal computer (PC) 166, immersive display 168, and so forth, with one another and with various other devices via a core network 110, a wireless access network 150 (e.g., a cellular network), an access network 120, other networks 140 and/or the Internet 145. In some examples, not all of the mobile devices and home network devices will be utilized in varying the intensity of an immersive experience. For instance, in some examples, presentation of an immersive experience of variable intensity may make use of the home network devices (e.g., immersive display 168, STB/DVR 162A, and/or Internet of Things devices (IoTs) 170), and may potentially also make use of any co-located mobile devices (e.g., mobile devices 167A and 167B), but may not make use of any mobile devices that are not co-located with the home network devices (e.g., mobile devices 157A and 157B).

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology including "fifth generation" (5G) and further generations. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB).

In one example, each of mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, a wearable smart device (e.g., a smart watch or fitness tracker), a gaming console, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, Internet 145, wireless access network 150, access network 120, and so forth. As shown in FIG. 1, core network 110 may also include a plurality of television (TV) servers 112, a plurality of content servers 113, a plurality of application servers 114, an advertising server (AS) 117, and an immersion server 115 (e.g., an application server). For ease of illustration, various additional elements of core network 110 are omitted from FIG. 1.

In one example, immersion server 115 may monitor a user's reactions to an immersive experience, which may be delivered to a device in the home network 160 (e.g., one or more of the mobile devices 157A, 157B, 167A, and 167B, the PC 166, the home phone 164, the TV 163, the immersive display 168, and/or the Internet of Things devices (IoTs) 170) by the TV servers 112, the content servers 113, the application servers 114, the ad server 117, and/or and immersion server. For instance, the immersion server 115 may receive data related to the user's reactions (also referred to herein as "user reaction indicators") directly from the device(s) to which the immersive experience is delivered (e.g., the device presenting the immersive experience to the user). The data may include, e.g., sensor readings from one or more sensors of the device to which the immersive experience is delivered (e.g. cameras, microphones, biometric sensors, etc.). The data may be received by the immersion server 115 in real time, e.g., as the sensors collect the data. The immersion server 115 may alternatively or in addition receive the data from other devices in the vicinity of the device(s) to which the immersive experience is being delivered. For instance, the data could be collected by one or more IoT devices (e.g., a virtual assistant device, a security system, etc.), by the user's mobile phone or wearable smart device (e.g., smart watch or fitness tracker), or the like.

The immersion server 115 may analyze the data in real time (e.g., as the data is received) in order to estimate the user's current level of comfort with the immersive experience. For instance, as discussed above, different users may experience different levels of comfort or discomfort when presented with the same subject matter, images, noises, and the like. The immersion server 115 may estimate the user's current level of comfort with the item of immersive experience in a variety of ways. For instance, the immersion server 115 could perform image processing on camera images of the user (e.g., facial analysis of images of the user's face, or image analysis of the user's body language, could yield cues as to the user's level of comfort). Alternatively, the immersion server 115 could perform content analysis on an audio signal of the user (e.g., the user's level of comfort could be indicated by laughing, screaming, crying, etc.; sentiment analysis may be performed on utterances made by the user, such as exclamations of discomfort or fear). In further examples, the immersion server 115 may perform an analysis of biometric indicators of the user in order to estimate the user's current level of comfort (e.g., increased heart rate, increased skin conductivity, dilated pupils, and/or other indicators may indicate that the user is scared, while a lowered heart rate, steady breathing, and/or other indicators may indicate that the user is calm).

In response to the estimating the user's level of comfort, the immersion server 115 may select and transmit a variant of a segment of the immersive experience in real time to improve the user's level of comfort with the immersive experience. The variant may comprise an alternate version of the segment that has been edited to remove elements of the segment that are known to cause discomfort in some users and/or in a specific user. For instance, if the data collected by the sensors indicates that the user is scared during a scene that simulates being on a roller coaster (e.g., images of the user depict him gripping the armrests of a chair, audio of the user shows him breathing heavily, biometric sensors indicate an elevated heart rate, etc.), then the immersion server 115 may select a variant that seeks to make the user less scared. For instance, the immersion server 115 may select a variant that slows down the speed of the simulated roller coaster ride, that makes the drops of the simulated roller coaster ride smaller, and/or that eliminates portions of the roller coaster ride that simulate being upside down.

In one example the immersion server 115 may additionally have access to user profiles that store information related to user preferences and comfort levels with various types of stimuli and subject matter. The user profiles may be retrieved from network storage, e.g., application servers 114, by the immersion server 115. For instance the user profiles may be maintained by a network service (e.g., an Internet service provider, a streaming media service, a gaming subscription, etc.). In a further example, the user profiles may include user reaction indicators, or measurable user characteristics from which a user's level of comfort can be inferred. For instance, the user reaction indicators may include heart rate, skin conductivity, blood pressure, blood oxygenation, pupil dilation, breathing patterns, and/or the like. Each user reaction indicator may be associated with a baseline value that is specific to the user. That is, the baseline value may comprise an average value of the user reaction indicator that is determined specifically for the user. In one example, the baseline value may be determined by presenting various clips of different types of immersive experiences to the user and measuring the user reaction indicators. The different types of immersive experiences may include stimuli and subject matters that are known to be common sources of discomfort to users in general (e.g., heights, darkness, speed, spiders, clowns, loud noises, strobing lights, etc.).

The immersion server 115 may also have access to third party data sources (e.g., server 149 in other network 140), where the third party data sources may comprise historical, background and other data relating to stimuli and subject matters that are known to be common sources of discomfort to users.

The immersion server 115 may interact with television servers 112, content servers 113, and/or advertising server 117, to select which video programs (or other content), advertisements, and/or variants to include in an immersive experience being delivered to a user endpoint device. For instance, the content servers 113 may store scheduled television broadcast content for a number of television channels, video-on-demand programming, local programming content, gaming content, and so forth. The content servers 113 may also store other types of media that are not audio/video in nature, such as audio-only media (e.g., music, audio books, podcasts, or the like) or video-only media (e.g., image slideshows). For example, content providers may upload various contents to the core network to be distributed to various subscribers. Alternatively, or in addition, content providers may stream various contents to the core network for distribution to various subscribers, e.g., for live content, such as news programming, sporting events, and the like. In one example, advertising server 117 stores a number of advertisements that can be selected for presentation to subscribers, e.g., in the home network 160 and at other downstream viewing locations. For example, advertisers may upload various advertising content to the core network 110 to be distributed to various viewers.

Figure 3:
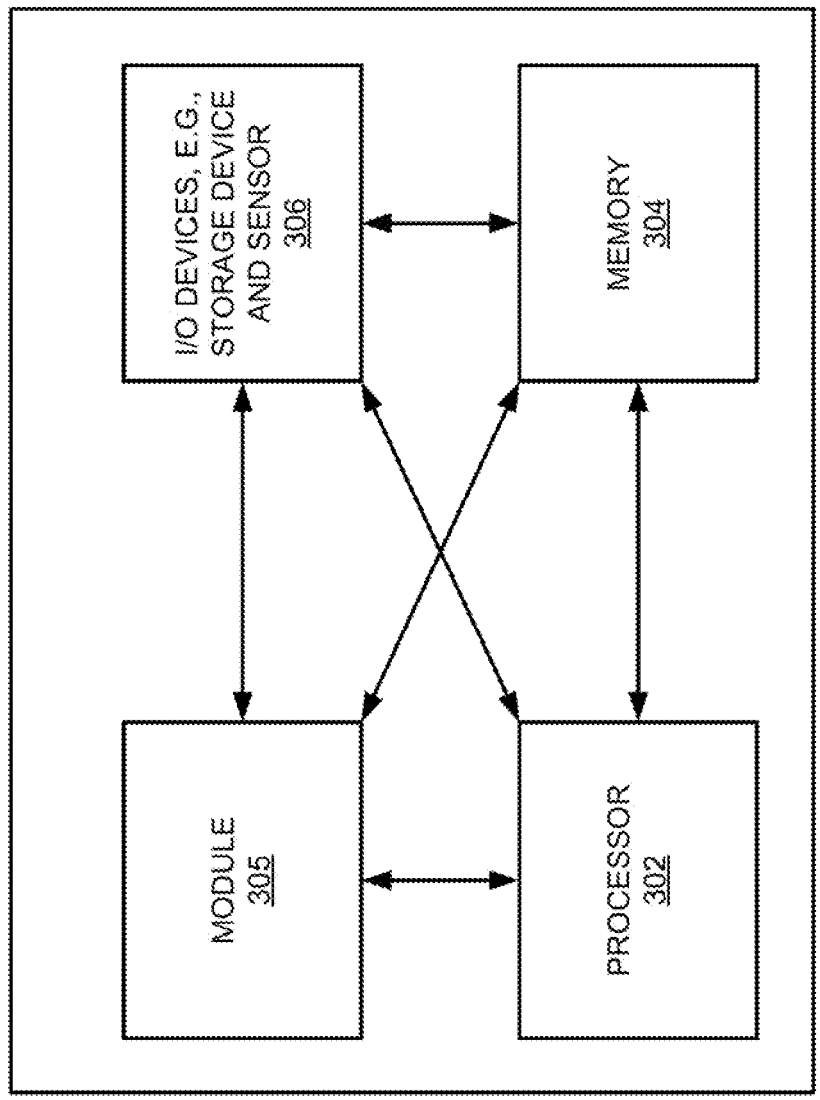
FIG. 3 illustrates an example of a computing device, or computing system, specifically programmed to perform the steps, functions, blocks, and/or operations described herein.

In one example, any or all of the television servers 112, content servers 113, application servers 114, immersion server 115, and advertising server 117 may comprise a computing system, such as computing system 300 depicted in FIG. 3.

In one example, the access network 120 may comprise a Digital Subscriber Line (DSL) network, a broadband cable access network, a Local Area Network (LAN), a cellular or wireless access network, a 3rd party network, and the like. For example, the operator of core network 110 may provide a cable television service, an IPTV service, or any other type of television service to subscribers via access network 120. In this regard, access network 120 may include a node 122, e.g., a mini-fiber node (MFN), a video-ready access device (VRAD) or the like. However, in another example node 122 may be omitted, e.g., for fiber-to-the-premises (FTTP) installations. Access network 120 may also transmit and receive communications between home network 160 and core network 110 relating to voice telephone calls, communications with web servers via the Internet 145 and/or other networks 140, and so forth.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163 and/or immersive display 168 for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A and 167B, IoTs 170 and so forth.

In one example, router 165 may further communicate with TV (broadly a display) 163 and/or immersive display 168, e.g., where one or both of the television and the immersive display incorporate "smart" features. The immersive display may comprise a display with a wide field of view (e.g., in one example, at least ninety to one hundred degrees). For instance, head mounted displays, simulators, visualization systems, cave automatic virtual environment (CAVE) systems, stereoscopic three dimensional displays, and the like are all examples of immersive displays that may be used in conjunction with examples of the present disclosure. In other examples, an "immersive display" may also be realized as an augmentation of existing vision augmenting devices, such as glasses, monocles, contact lenses, or devices that deliver visual content directly to a user's retina (e.g., via mini-lasers or optically diffracted light). In further examples, an "immersive display" may include visual patterns projected on surfaces such as windows, doors, floors, or ceilings made of transparent materials.

In another example, the router 165 may further communicate with one or more IoTs 170, e.g., a connected security system, an automated assistant device or interface, a connected thermostat, a connected speaker system, or the like. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, one or both of the STB/DVR 162A and STB/DVR 162B may host an operating system for presenting a user interface via TVs 163 and/or immersive display 168, respectively. In one example, the user interface may be controlled by a user via a remote control or other control devices which are capable of providing input signals to a STB/DVR. For example, mobile device 167A and/or mobile device 167B may be equipped with an application to send control signals to STB/DVR 162A and/or STB/DVR 162B via an infrared transmitter or transceiver, a transceiver for IEEE 802.11 based communications (e.g., "Wi-Fi"), IEEE 802.15 based communications (e.g., "Bluetooth", "ZigBee", etc.), and so forth, where STB/DVR 162A and/or STB/DVR 162B are similarly equipped to receive such a signal. Although STB/DVR 162A and STB/DVR 162B are illustrated and described as integrated devices with both STB and DVR functions, in other, further, and different examples, STB/DVR 162A and/or STB/DVR 162B may comprise separate STB and DVR components.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
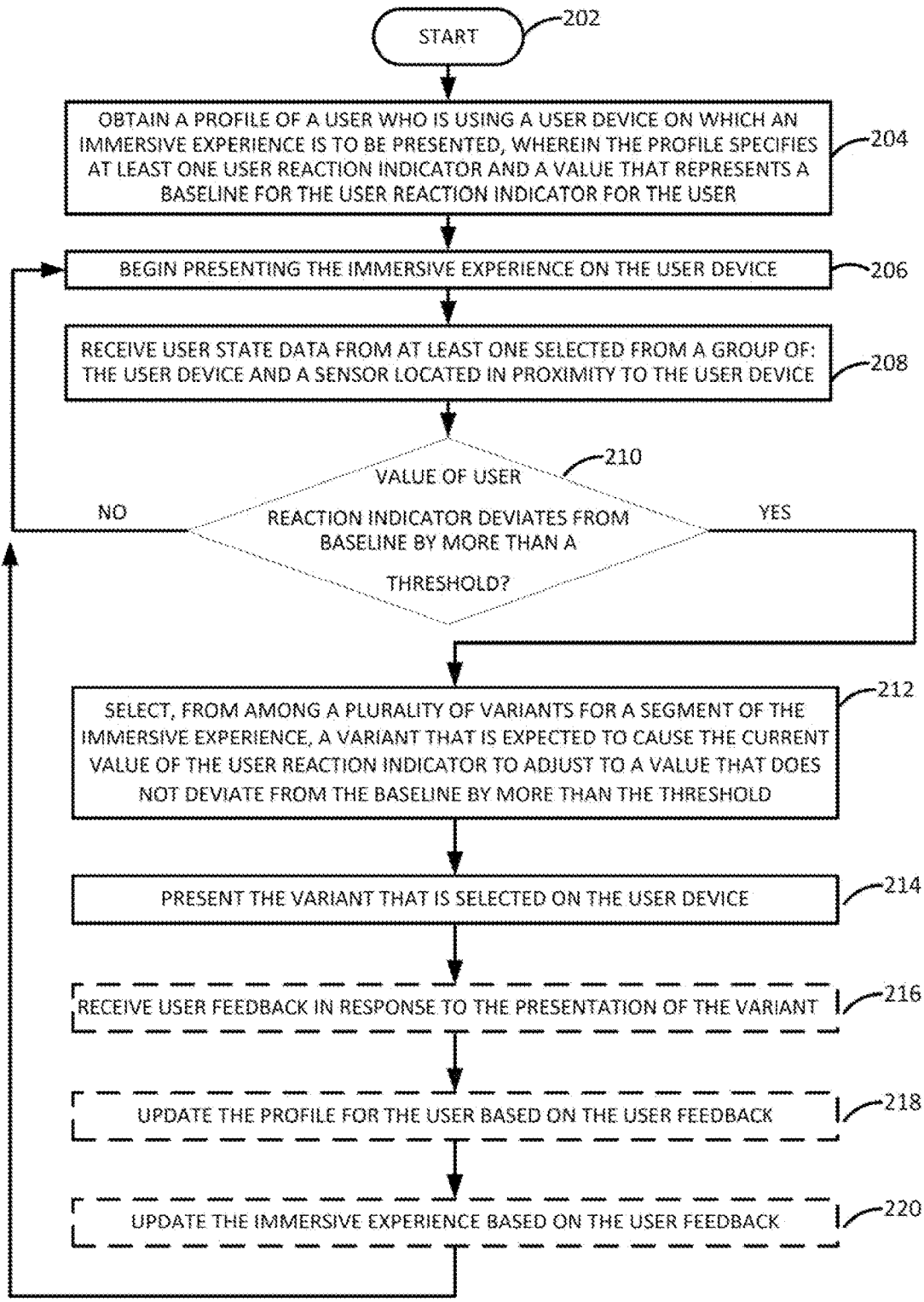
FIG. 2 illustrates a flowchart of an example method for providing variable-intensity immersion for extended reality media, in accordance with the present disclosure.

FIG. 2 illustrates a flowchart of an example method 200 for providing variable-intensity immersion for extended reality media, in accordance with the present disclosure. In one example, steps, functions and/or operations of the method 200 may be performed by a device as illustrated in FIG. 1, e.g., immersion server 115 or any one or more components thereof. In one example, the steps, functions, or operations of method 200 may be performed by a computing device or system 300, and/or a processing system 302 as described in connection with FIG. 3 below. For instance, the computing device 300 may represent at least a portion of the immersion server 115 in accordance with the present disclosure. For illustrative purposes, the method 200 is described in greater detail below in connection with an example performed by a processing system, such as processing system 302.

The method 200 begins in step 202. In step 204, the processing system may obtain a profile of a user who is using a user device on which an immersive experience is to be presented, wherein the profile specifies at least one user reaction indicator and a value that represents a baseline for the user reaction indicator for the user. In one example, if a user-specific profile is not available (e.g., it is the first time that the user has engaged the system, or other privacy policies prevent storage of a profile for a specific user), then the processing system may copy or bootstrap a profile from a similar group (or cohort) of users. One example is the creation of a profile for a child whose data may not be stored. In this case, the processing system may utilize a generic "child" profile based on the experiences of previously opted in, laboratory-based users. In another example, a user may be otherwise anonymous (e.g., a user who has come to the system via anonymized or third party partial web traffic), but at least one piece of information is known about the user (e.g., such as IP address, location of device, or web browser used to access the system). With any of these weak, but known, identifiers, a generic profile may be selected and copied for local use. The generic profile may subsequently be updated by further steps of the method 200, described in greater detail below.

The user device may be any type of device that is capable of presenting an immersive experience, either alone or in combination with other devices. For instance, the user device may comprise an immersive display, such as a head mounted display, a stereoscopic three-dimensional display, or the like. The user device may also comprise a more conventional display, such as a television, a tablet computer, or the like, that is co-located (e.g., in the same room as) one or more IoT devices, such as a smart thermostat, a smart lighting system, a smart audio system, a virtual assistant device, or the like. In such cases, the immersive experience may comprise a visual component. For instance, the immersive experience may comprise receiving a data stream for a video game, a film, a training simulation, or the like.

The user device may also comprise a device that does not have a display. For instance, the user device might comprise a speaker system that uses beamforming or speaker location to manipulate the directions and locations from which sound is emitted and/or to which sound is directed. In such cases, the immersive experience may comprise an audio component, but may lack a visual component. For instance, the immersive experience may comprise a radio program, a podcast, an audio book, or the like.

As discussed above, the user profile may indicate at least one user reaction indicator and a value that represents a baseline for the user reaction indicator for the user. User reaction indicators may include measurable or quantifiable characteristics that correlate to user reactions, such as biometric indicators (e.g., heart rate, breathing rate, skin conductivity, pupil dilation, etc.). For instance, if the user's heart rate is very close to the baseline for the user, this may indicate that the user is feeling calm; however, if the user's heart rate is more than a threshold above the baseline for the user, this may indicate that the user is feeling scared or anxious.

In one example, baselines for user reaction indicators may be user-specific rather than based on general or average reactions. For instance, in one example, a user profile may be constructed for a specific user by presenting clips of various different types of media to the user (e.g., scenes depicting falls from various heights, scenes depicting movement at various speeds, scenes depicting various degrees of camera movement, scenes depicting strobe effects, scenes depicting spiders, snakes, clowns, and the like, and scenes depicting other types of subject matter that may be known to cause discomfort in users). Clips that do not depict subject matter that is known to cause discomfort may also be presented (e.g., funny scenes, romantic scenes, calming scenes, etc.). User reaction indicators for the user may be monitored and recorded as the various clips are presented, and subsequently analyzed to determine baselines for the user reaction indicators, as well as any peaks that might correspond to scenes in which sources of discomfort for the user were depicted. For instance, a user's heart rate may remain relatively steady (e.g., beats per minute may not vary by more than x) as the clips are presented, but a peak (e.g., a sudden spike in beats per minute that is greater than a threshold) may be observed when the user is presented with a clip that depicts a clown, which may indicate that clowns make the user uncomfortable.

In one example, certain types of subject matter may be flagged as potential sources of user discomfort in the user profile. For instance, if a peak is observed in the user's heart rate whenever the user is presented with a scene depicting a clown, as discussed above, then the user profile may indicate that clowns are a potential source of discomfort for the user. This may help the processing system to preemptively adapt the immersive experience, as discussed in greater detail below. For instance, if the processing system has information indicating that a clown is going to be depicted in a segment of the immersive experience, the processing system may preemptively flag the scene for adaptation before the scene is presented to the user, so that the user never sees the clown. The user may also manually configure his profile to specify sources of discomfort. For instance, the profile may provide a list of various common sources of discomfort, where the user may check a box next to any sources of discomfort that cause discomfort for him personally.

In step 206, the processing system may begin presenting the immersive experience on the user device. As discussed above, presenting the immersive experience may comprise delivering a computer-generated overlay to the user device, so that the user device may display the computer-generated overlay in conjunction with a separate item of media content (e.g., a view of a real world environment, or a live or prerecorded media stream). In another example, presenting the immersive experience may comprise delivering a computer-generated item of media content that comprises the immersive experience in its totality (e.g., the media delivered to the user device does not need to be presented in conjunction with another item of media content to produce an immersive experience). In another example, presenting the immersive experience may comprise sending commands to one or more other devices that are co-located with the user device (e.g., IoT devices such as smart thermostats, smart lighting systems, smart audio systems, virtual assistant devices, smart tactile actuators, and the like), where the commands instruct the one or more other devices to adjust their settings while an item of media content is playing on the user device.

In one example, the immersive experience has been processed, prior to the presenting, to identify segments (e.g., scenes, chapters, video game levels, or the like) that may include "high impact" events. In one example, a "high impact" event is defined as an event that is believed to be a potential source of user discomfort. For instance, many people are afraid of heights; thus, a scene of a video game that makes a user feel as if he is looking down from the top of a skyscraper may be highly uncomfortable to a user who is afraid of heights. Other people may be afraid of objects such as spiders, snakes, clowns, or the like. Thus, a scene that makes a user feel as if a spider or snake is crawling on him, or a scene that depicts a clown, may be highly uncomfortable to a user who is afraid of spiders, snakes, or clowns. Other people may be sensitive to loud noises; thus, a very loud scene (e.g., depicting a shootout, an explosion, a loud concert, or the like) may be highly uncomfortable to users who are sensitive to loud noises. However, other users may not be uncomfortable with (and may even enjoy) any of these things. Other potential "high impact" events might include events that appear to put a user in peril, events that may induce vertigo or spatial disorientation, events that depict unusual or unnatural modifications of physics (e.g., loss of gravity, flying, spinning, etc.), events that depict intentional disconnects of the audio and video components (e.g., characters approaching from behind, intense lighting, etc.), and events that include intentional tactile or physiological simulation (e.g., haptic feedback).

Thus, in one example, having been processed to identify high impact events, the immersive experience may include one or more variants for any of these high impact events. In one example, a variant may include an alternate segment (e.g., scene, chapter, video game level, or the like) that can be presented on the user device in place of a default segment (e.g., the segment that is presented in the absence of any indications of user discomfort). For instance, if a scene of a video game that makes a user feel as if he is looking down from the top of a skyscraper is flagged as a segment that includes a high impact event, then one variant of the segment may modify the scene to make the user feel as if he is looking down from the top of a much shorter building. Another variant of the segment may omit the scene altogether (e.g., such that there is no scene where the user is made to feel as if they are looking down from the top of a building, of any height). In another example, a segment of a video game may include a scene that makes a user feel as if he is behind the wheel of a car during a high-speed chase. Variants of the segment may slow down the speed of the car to various different, slower speeds during the chase scene. Thus, variants for a segment of the immersive experience including a high impact event may be tailored to different degrees of user comfort (e.g., by lessening, to different degrees, the prominence or intensity of the high impact event in the segment).

In one example, variants may be provided by the content creator. For instance, the creator of a film that is presented as an immersive experience may film and create variants for one or more segments of the film and provide these variants as part of the film for use as needed.

In one example, the immersive experience may include metadata tags that indicate when variants are available for segments of the immersive experience. The tags may include pointers to the variants that correspond to a tagged segment. For instance, where a segment of an immersive film includes a scene that makes a user feel as if spiders are crawling on him, the segment may be tagged to indicate that variants are available. The tag may include a first pointer to a first variant in which the spiders are replaced with mice and a second pointer to a second variant in which nothing is crawling on the user. The variants may also be tagged to provide indications of how the variants modify the segments (e.g., mice, nothing, etc.).

In step 208, the processing system may receive user state data from at least one selected from a group of: the user device and a sensor located in proximity to the user device. In one example, the sensor may be part of the user device. For instance, a head mounted display that is used to present an extended reality video game might include skin conductivity sensors positioned to contact the user's face, a microphone to capture user audio (e.g., utterances, screams, etc.), or cameras focused on the user's eyes (which can be used to detect pupil dilation, rapid blinking, and other ocular characteristics). In another example, the sensor may be part of another device that is co-located with the user device. For instance, the user device may be a head mounted display, but the other device may be a fitness tracker that the user is wearing, where the fitness tracker may include a sensor that is able to detect the user's skin conductivity, heart rate, blood oxygenation, or other biometrics. Alternatively, the user device may be a head mounted display, but the other device may be an audio sensor or a camera that is part of an IoT device (e.g., a smart security system, a virtual assistant device, or the like).

In one example, the sensor may send the user state data to the processing system continuously, so that the processing system can detect any significant changes in the user state data as quickly as possible. In another example, to save bandwidth and/or processing resources, the sensor may send the user state data to the processing system on a periodic basis (e.g., every x seconds, once a minute, or the like). In another example, the sensor may send the user state data to the processing system whenever the user state data changes by more than a threshold within a defined window of time (e.g., a change of more than x units of measure within y seconds or minutes).

In step 210, the processing system may determine, based on the user state data, whether a current value of the user reaction indicator for the user deviates from the baseline for the user by more than a threshold. For instance, the user state data received in step 208 may comprise a reading of the user's current heart rate. The processing system may compare the reading of the user's current heart rate to the user reaction indicator of "heart rate" in the user's user profile, where the user profile specifies a baseline heart rate for the user. If the user's current heart rate is greater than or less than the baseline heart rate for the user by more than a threshold (e.g., is more than x beats per minute above the baseline heart rate for the user), then the processing system may determine that the current value of the user reaction indicator deviates from the baseline for the user by more than a threshold.

In one example, the processing system may infer that a user is uncomfortable with a segment of the immersive experience that is currently being presented if a current measurement for one of the user reaction indicators deviates from the baseline for the user reaction indicator for the user by more than the threshold. However, in other examples, a deviation in a single user reaction indicator may not be enough to conclude that the user is uncomfortable. For instance, even though the user's heart rate may be above a baseline heart rate for the user, which may indicate some degree of fear, the user may enjoy feeling slightly scared. Thus, in some cases, an inference of user discomfort may be based on some aggregation or combination of measurements for different user reaction indicators exceeding a baseline aggregation by more than a threshold for the user. In one example, the aggregation may be normalized and/or weighted so that user reaction indicators that are considered to provide a more reliable indication of comfort for the specific user are weighted more heavily.

For instance, a first user reaction indicator might be based on heart rate, a second user reaction indicator might be based on skin conductivity, and a third user reaction indicator might be based on pupil dilation. Deviations from baselines for these user reaction indicators may be scored. For example, a deviation of one to five units of measure might receive a score of "one;" a deviation of six to ten units of measure might receive a score of "two;" a deviation of eleven to fifteen units of measure might receive a score of "three;" and so on. These scores may then be summed or averaged to calculate a single score that represents an aggregate or combined deviation from the baseline for the user. For instance, the first user reaction indicator may receive a score of three, the second user reaction indicator may receive a score of one, and the third user reaction indicator may receive a score of zero. Thus, a summed score for the combination of user reaction indicators would be four (i.e., 3+1+0), while an average score for the combination of user reaction indicators would be 1.33 (i.e., (3+1+0)/3). If the resulting average score is greater than a threshold score, this may indicate that the aggregation or combination of measurements for the different user reaction indicators exceeds a baseline aggregation by more than a threshold or acceptable amount.

As discussed above, the scores for the individual user reaction indicators may be weighted (i.e., multiplied by different weights). For instance, if a user's skin conductivity is considered a more reliable indicator of his discomfort than his heart rate, but his heart rate is considered a more reliable indicator than his pupil dilation, then the score for skin conductivity may be weighted by a factor of three, the score for heart rate may be weighted by a factor of two, and the score for pupil dilation may be unweighted. Revisiting the above example scores, these weightings would result in a summed score of nine (i.e., (3*2)+(1*3)+(01)), or an average score of three (i.e., (3*2)+(1*3)+(0*1)/3).

In some examples, the user state data may also include sensor data that is not measureable or quantifiable, but that may add some measure of confidence to the values of the measurable characteristics. For instance, sensors may provide images of the user. Image processing techniques, including facial recognition techniques, may allow the processing system to determine when the user is displaying visual cues that indicate discomfort (e.g., squirming, covering his eyes, looking away, etc.). Sensors may also provide audio of the user. Audio processing techniques, such as voice recognition, sentiment analysis, and the like, allow the processing system to extract meaning from utterances made by the user, as well as other audible cues that indicate discomfort (e.g., crying, "I feel dizzy," "Why did it have to be snakes?," etc.). Unquantifiable image and/or audio data, in combination with more quantifiable user reaction indicators, may provide a greater confidence in an inference of user comfort or discomfort. For instance, in one example, a score as described above could be weighted by some factor if non-quantifiable indicators of discomfort are observed.

If the processing system concludes in step 210 that the current value of the user reaction indicator for the user does not deviate from the baseline by more than a threshold, then the method 200 may return to step 206, and the processing system may continue to perform the operations discussed in connection with steps 206-210.

If, however, the processing system concludes in step 210 that the current value of the user reaction indicator for the user does deviate from the baseline by more than the threshold, then the method 200 may proceed to step 212. In step 212, the processing system may select, from among a plurality of variants for a segment of the immersive experience, a variant that is expected to cause the current value of the user reaction indicator to adjust to a value that does not deviate from the baseline by more than the threshold.

For instance, as discussed above, various segments of the immersive experience may be associated with variants, or alternate segments that can be presented in place of a default segment of the immersive experience. In one example, the processing system may determine that at least one variant exists for either the segment of the immersive experience that is currently being presented or for an upcoming (i.e., yet to be presented) segment of the immersive experience. The existence and type of variants associated with a segment may be indicated by metadata tags, as described above. The processing system may determine whether any of the variants that are available for the segment may be better suited for the user than the default segment. For instance, if the user's heart rate is elevated (i.e., is more than a threshold above a baseline heart rate for the user), and an upcoming (default) segment of the immersive experience includes a scene that makes the user feel as if he is behind the wheel of a fast moving car, then the processing system may determine that it might be more appropriate to present a variant of the segment in which the car is moving more slowly.

In step 214, the processing system may present the variant that is selected on the user device. In one example, where the processing system is streaming the immersive experience to the user device, the processing system may simply replace the default segment with the variant (broadly a variant segment) that is selected. Once the variant ends, the processing system may resume streaming the immersive experience including the default segments for any upcoming segments. However, in another example, the processing system may simply send the default segment, independent of a remainder of the immersive experience, along with instructions on when to play the variant so that the variant overrides or replaces the default segment.

In optional step 216 (illustrated in phantom), the processing system may receive user feedback in response to the presentation of the variant. In one example, the user feedback may comprise explicit feedback indicating whether or not the first presentation of the variant was effective in bringing the current value of the user reaction indicator for the user back within the threshold of the baseline. For instance, the first user may provide a signal via an interactive dialog to indicate whether or not his comfort level with the immersive experience was improved by presentation of the variant. In another example, the sensors may detect a predefined gesture or statement that indicates that the first user is more comfortable (e.g., the first user may say "that's better," or may give a thumbs up).

Alternatively, the user feedback may comprise implicit feedback that may be inferred based on the same measurable characteristics that the user reaction indicators are based on. For instance, if the variant was presented in response to the user's heart rate rising above a baseline heart rate for the user by more than a threshold, and the first user's heart rate lowers to within the threshold after the variant is presented, then the processing system may infer that presentation of the variant was effective.

In optional step 218 (illustrated in phantom), the processing system may update the profile for the user based on the user feedback. For instance, in one example, the profile may be updated to indicate the user reaction indicator and value of the user reaction indicator prior to the variant being presented, as well as the value of the user reaction indicator after the variant was presented. The profile may also be updated to indicate the type of variant that was selected (e.g., slower speed, no spiders, etc.). The profile may also be updated to indicate new potential sources of discomfort for the user. For instance, clowns may not have been identified in the user's profile as a source of discomfort, but the user may have repeatedly appeared to be uncomfortable when clowns were depicted during the immersive experience. Thus, the profile may be updated to indicate clowns as a potential source of discomfort. Similarly, the profile could be updated to remove potential sources of discomfort. For instance, the user's profile may have indicated heights as a potential source of discomfort; however, the user may have appeared to be perfectly comfortable when scenes of the immersive experience were depicted from great heights. In addition to adding or removing sources of potential discomfort, the profile could also be updated to adjust the degree of discomfort of the user with particular types of subject matter (e.g., the user is not as afraid of clowns as previously indicated, but still doesn't like them).

The user feedback may be used by the processing system to inform the manner in which segments of the immersive experience (and other immersive experiences which may be presented to the user in the future) are replaced with variants. For instance, if the variant presented in step 214 is deemed to have been ineffective, or if the user indicates dissatisfaction with the presentation of the variant, then the processing system may replace similar segments with a different type of variant (or no variant at all). Alternatively, if the variant presented in step 214 is deemed to have been effective, or if the user indicates satisfaction with the presentation of the variant, then the processing system may replace similar segments with a similar type of variant.

In optional step 220 (illustrated in phantom), the processing system may update the immersive experience based on the user feedback. For instance, if the user is observed to react positively to the presentation of a particular variant (e.g., presenting a variant that omits clowns in place of a default segment that includes clowns results in a user reaction indicator for the user being brought within a threshold of a baseline of the user reaction indicator for the user), then similar variants may be flagged to replace future segments of the immersive experience (e.g., other segments including clowns may be replaced with clown-free variants).

The method 200 may then return to step 206, and the processing system may proceed as described above to continuously monitor the user's reactions while presenting the immersive experience. Thus, steps 206-220 may be repeated any number of times until presentation of the immersive experience concludes (e.g., the immersive experience may come to a scheduled end, or the user may pause or exit the immersive experience before a scheduled end).

The method 200 therefore allows the presentation of an immersive experience to be dynamically adapted, in real time, in response to a user's level of comfort, which ideally will make for a more enjoyable and engaging experience for the user. Segments that cause measurable user discomfort can be replaced with variants designed to ease the user's discomfort. However, if the user begins to grow more comfortable with subject matter or effects that previously caused discomfort, the subject matter or effects may be added back into the immersive experience (e.g., gradually). Thus, the method 200 continuously updates in response to the user.

The information regarding user reaction indicators and user feedback regarding variants can also be provided to content creators to help the content creators tune their content to be more adaptable to varying levels of user comfort with different types of subject matter. For instance, a particular scene of an immersive film may be observed, based on user reaction indicators, to make many users uncomfortable. As an example, the scene may be filmed in a first person point of view style that tends to be very jittery and causes many users to feel some degree of motion sickness. However, the content creator may not have considered that the scene could be a possible source of discomfort for users, and thus, may not have provided any variants for the scene. Upon detecting that a significant number of users (e.g., a number greater than a threshold) have experienced discomfort when experiencing the scene, the content creator may create one or more variants in order to minimize user discomfort. Similarly, even where the content creator has provided one or more variants for a scene, if the one or more variants have been determined to be ineffective in minimizing discomfort for some number of users, the content creator may identify a need to create a new variant for the scene.

Since the method 200 relied to some degree on user monitoring throughout the presentation of the immersive experience, the method 200 could be provided as an opt-in enhancement (e.g., receiving specific consent from the user) to the immersive experience. For instance, some users may find constant monitoring of their reactions to the immersive experience to be intrusive or distracting, while other users may find it reassuring.

In further examples, rather than comparing a user's reaction indicators to baselines for the user, the reaction indicators may be compared to reaction indicators of other users participating in the same immersive experience. This may help the processing system to determine whether a user's reactions are anomalous without the user having to go through the process of establishing a profile with baselines.

It should also be noted that, in some cases, rather than presenting a variant of a segment to improve user comfort, the processing system may simply pause or terminate the immersive experience.

Further examples of the disclosure could be applied to adapt an immersive experience for different audience. For instance, a teenager may be able to participate in a more "intense" immersive experience than a young child. Thus, a parent may be able to set a profile for a child that ensures that proper segment variants are selected, when available, for the child.

Still further examples of the present disclosure could assist with fields that are not strictly entertainment related. For instance, an immersive experience may simulate a real world environment or experience that can be used for therapeutic purposes (e.g., to address phobias or prepare for new life experiences). In another example, the processing system could be engaged in an educational format to help a user adjust to a new working condition, like training first responders in emergency situations where the level of peril (e.g., simulated avatar conditions or additional immersion challenges) are gradually and safely increased. In yet another example, a similar system for education could be used as part of a training program, where the detected baseline response levels for a user help to qualify the user for a particular ancillary job function (e.g., like assertions around cross-training a dental hygienist as a phlebotomist or cross-training a network routing engineer for equipment repair at increasing heights).

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 3 depicts a high-level block diagram of a computing device or processing system specifically programmed to perform the functions described herein. As depicted in FIG. 3, the processing system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for providing variable-intensity immersion for extended reality media, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200 or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for providing variable-intensity immersion for extended reality media (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for providing variable-intensity immersion for extended reality media (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
obtaining, by a processing system including at least one processor, a profile of a user who is using a user device on which an immersive experience is to be presented, wherein the profile specifies a user reaction indicator and a value that represents a baseline for the user reaction indicator for the user;
presenting, by the processing system, the immersive experience on the user device;
receiving, by the processing system, user state data including a current value of the user reaction indicator for the user, wherein the user state data is received from at least one of: the user device or a sensor that is located in proximity to the user device;
determining, by the processing system, that the current value of the user reaction indicator for the user deviates from the value that represents the baseline by more than a threshold;
in response to the determining, selecting, by the processing system from among a plurality of variants for a segment of the immersive experience, a variant that is expected to cause the current value of the user reaction indicator for the user to adjust to a value that does not deviate from the value that represents the baseline by more than the threshold;
presenting, by the processing system, the variant that is selected on the user device;
receiving, by the processing system, feedback from the user in response to the presenting the variant; and
updating, by the processing system, the profile based on the feedback to include the current value of the user reaction indicator, an identity of the variant, and a value of the user reaction indicator after the variant was presented.

2. The method of claim 1, wherein the user reaction indicator comprises at least one of: a heart rate, a skin conductivity, a pupil dilation, a breathing pattern, or a blood oxygenation.

3. The method of claim 1, wherein the value that represents the baseline is determined by presenting a plurality of clips of different media to the user and measuring reactions of the user to the plurality of clips of different media.

4. The method of claim 1, wherein the profile further specifies a subject matter that causes a discomfort to the user.

5. The method of claim 1, wherein the immersive experience has been processed, prior to the presenting, to identify segments of the immersive experience that contain events that are common causes of discomfort.

6. The method of claim 5, wherein each segment of the segments is associated with at least one variant for the each segment.

7. The method of claim 6, wherein metadata associated with the immersive experience indicates, for each segment of the segments, that the at least one variant is available.

8. The method of claim 6, wherein the at least one variant minimizes a common cause of discomfort in the segment of the segments.

9. The method of claim 1, wherein the updating further comprises:
   updating, by the processing system, the profile to include a previously unknown source of discomfort for the user.

10. The method of claim 1, further comprising:
    updating the immersive experience based on the feedback.

11. The method of claim 10, wherein the updating comprises:
    replacing, by the processing system, a future segment of the immersive experience with a variant that is similar to the variant that was presented.

12. The method of claim 1, further comprising:
    providing, by the processing system, second feedback to a creator of the immersive experience, wherein the second feedback indicates that the user experienced discomfort in response to the segment.

13. The method of claim 1, wherein the immersive experience comprises extended reality media.

14. The method of claim 1, where the variant that is selected lessens an intensity of a high impact event in the segment.

15. The method of claim 1, wherein a confidence in the current value of the user reaction indicator for the user is based on at least one of: a visual cue provided by the user or an audible cue provided by the user.

16. A non-transitory computer-readable medium storing instructions which, when executed by a processing system including at least one processor, cause the processing system to perform operations, the operations comprising:
    obtaining a profile of a user who is using a user device on which an immersive experience is to be presented, wherein the profile specifies a user reaction indicator and a value that represents a baseline for the user reaction indicator for the user;
    presenting the immersive experience on the user device;
    receiving user state data including a current value of the user reaction indicator for the user, wherein the user state data is received from at least one of: the user device or a sensor that is located in proximity to the user device;
    determining that the current value of the user reaction indicator for the user deviates from the value that represents the baseline by more than a threshold;
    in response to the determining, selecting, from among a plurality of variants for a segment of the immersive experience, a variant that is expected to cause the current value of the user reaction indicator for the user to adjust to a value that does not deviate from the value that represents the baseline by more than the threshold;
    presenting the variant that is selected on the user device;
    receiving feedback from the user in response to the presenting the variant; and
    updating the profile based on the feedback to include the current value of the user reaction indicator, an identity of the variant, and a value of the user reaction indicator after the variant was presented.

17. The non-transitory computer-readable medium of claim 16, wherein the profile further specifies a subject matter that causes a discomfort to the user.

18. The non-transitory computer-readable medium of claim 16, wherein the updating further comprises:
    updating the profile to include a previously unknown source of discomfort for the user.

19. The non-transitory computer-readable medium of claim 16, wherein the operations further comprise:
    updating the immersive experience based on the feedback by replacing a future segment of the immersive experience with a variant that is similar to the variant that was presented.

20. A device comprising:
    a processing system including at least one processor; and
    a non-transitory computer-readable medium storing instructions which, when executed by the processing system, cause the processing system to perform operations, the operations comprising:
        obtaining a profile of a user who is using a user device on which an immersive experience is to be presented, wherein the profile specifies a user reaction indicator and a value that represents a baseline for the user reaction indicator for the user;
        presenting the immersive experience on the user device;
        receiving user state data including a current value of the user reaction indicator for the user, wherein the user state data is received from at least one of: the user device or a sensor that is located in proximity to the user device;
        determining that the current value of the user reaction indicator for the user deviates from the value that represents the baseline by more than a threshold;
        in response to the determining, selecting, from among a plurality of variants for a segment of the immersive experience, a variant that is expected to cause the current value of the user reaction indicator for the user to adjust to a value that does not deviate from the value that represents the baseline by more than the threshold;
        presenting the variant that is selected on the user device;
        receiving feedback from the user in response to the presenting the variant; and
        updating the profile based on the feedback to include the current value of the user reaction indicator, an identity of the variant, and a value of the user reaction indicator after the variant was presented.

* * * * *